US007603324B2

(12) United States Patent
Hamilton et al.

(10) Patent No.: US 7,603,324 B2
(45) Date of Patent: *Oct. 13, 2009

(54) OPERATIONALIZING A LEARNING SOLUTION

(75) Inventors: Charles A. Hamilton, Vancover (CA); Janis A. Morariu, Hardy, VA (US); Tony M. O'Driscoll, Cary, NC (US); James J. Sharpe, Morton, IL (US); Mark F. Sidlauskas, Closter, NJ (US); Inderpreet S. Thukral, Delmar, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/061,762

(22) Filed: Apr. 3, 2008

(65) Prior Publication Data

US 2008/0189229 A1 Aug. 7, 2008

Related U.S. Application Data

(63) Continuation of application No. 10/729,761, filed on Dec. 5, 2003, now Pat. No. 7,371,070.

(51) Int. Cl.
*G06F 15/18* (2006.01)

(52) U.S. Cl. .......................................................... 706/12

(58) Field of Classification Search .................... 706/12
See application file for complete search history.

(56) References Cited

U.S. PATENT DOCUMENTS 5,061,997 A * 10/1991 Rea et al. .................... 348/143
5,786,809 A * 7/1998 Ryzhov et al. .............. 345/168
5,970,482 A 10/1999 Pham et al.
6,341,960 B1 1/2002 Frasson et al.
6,604,094 B1 8/2003 Harris
7,281,219 B2 * 10/2007 Hamilton et al. ............ 715/834
7,371,070 B2 * 5/2008 Hamilton et al. ............ 434/322
2002/0076674 A1 6/2002 Kaplan
2002/0077884 A1 6/2002 Sketch
2002/0087346 A1 7/2002 Harkey
2002/0132213 A1 9/2002 Grant et al.
2002/0169822 A1 11/2002 Packard et al.

(Continued)

FOREIGN PATENT DOCUMENTS

JP 2000066572 A 3/2000

(Continued)

OTHER PUBLICATIONS

A consensus structure inference algorithm Chiu, D.K.Y.; Computer Vision and Pattern Recognition, 1991. Proceedings CVPR '91., IEEE Computer Society Conference on Jun. 3-6, 1991 pp. 755-756 Digital Object Identifier 10.1109/CVPR.1991.139815.*

(Continued)

*Primary Examiner*—Michael B Holmes
(74) *Attorney, Agent, or Firm*—John Pivnichny

(57) ABSTRACT

A learning solution context is specified in terms of formal and informal learning within zones of interaction. Solution components of purpose/outcome, measurement, technology/infrastructure, resources, and process are specified and selected to align each to the solution context providing an optimal learning solution for a particular client.

6 Claims, 1 Drawing Sheet

U.S. PATENT DOCUMENTS

| | | | |
|---|---|---|---|
| 2004/0078146 | A1 | 4/2004 | Lombardo et al. |
| 2004/0148277 | A1 | 7/2004 | Gray |
| 2005/0123894 | A1 | 6/2005 | Hamilton et al. |
| 2005/0156943 | A1 | 7/2005 | Fujioka et al. |
| 2006/0036629 | A1 | 2/2006 | Gray |
| 2006/0036630 | A1 | 2/2006 | Gray |
| 2006/0112030 | A1 | 5/2006 | Cowherd et al. |

FOREIGN PATENT DOCUMENTS

| | | | |
|---|---|---|---|
| JP | 2803928 | A1 | 7/2001 |
| JP | 2001350854 | A | 12/2001 |
| JP | 2003084653 | A | 3/2003 |
| KR | 2001077749 | | 2/2000 |
| KR | 2001000529 | | 10/2000 |
| KR | 2002074241 | | 3/2001 |
| KR | 2001103810 | | 7/2001 |

OTHER PUBLICATIONS

Measurements of Some Operational Characteristics of an Amplitude-Modulated Injection-Locked UHF Magnetron Transmitter Koros, L.L.; Proceedings of the IRE vol. 41, Issue 1, Jan. 1953 pp. 4-10 Digital Object Identifier 10.1109/JRPROC.1953.274476.*

Lloyd, Gregory (2001), Gain Credit with the CLEP (College Level Examination Program).

Wade, V. & Power C., "Evaluating the Design and Delviery of WWW Based Educational Environments and Coursewares", 6th Annual Conference on the Teaching of Computing, Dublin, Ireland, Aug. 17-21, 1998, pp. 243-248.

Saddik et al., "Reusability and Adaptability of Interactive Resources in Web-Based Educational Systems", ACM Journal of Educational Resources in Computing, vol. 1, No. 1, Spring 2001, Article #2, pp. 1-19.

Saddik et al., "Metadata for Smart Multimedia Learning Objects", ACE 2000, Dec. 2000, Melbourne, Australia, pp. 87-94.

Tortora et al., "A Multilevel learning Management System", SEKE '02, Jul. 15-19, 2002, Ischia, Italy, pp. 541-547.

McTear, Michael F., "Spoken Dialogue Technology: Enabling the Conversational User Interface", ACM Computing Surveys, vol. 34, No. 1, Mar. 2002, pp. 90-169.

Shin et al., "A Web-Based, Interactive Virtual Laboratory System for Unit Operations and Process Systems Engineering Education: Issues, Design and Implementation", Computers and Chemical Engineering, vol. 26, Issue 2, Feb. 15, 2002, pp. 319-330.

Morcos et al., "Assessing Student Learning in a Distance Education Education Environment", Frontiers in Education Conference, Oct. 18-21, 2000, Kansas City, Missouri, vol. 2, p. S3D-5.

Klein et al., "A Process Model for Developing Virtual Education Contents", Wirtschaftsinformatik, Germany, vol. 43, Issue 1, Feb. 2001, pp. 35-45.

Williams, Melody, A., "Integrating Concept Mapping Into Science Curriculum and Instructional Practice: Teacher Experiences, Observations, and Reccomendations for Future Projects", Journal of Interactive Learning Research, 1997, pp. 457-485.

* cited by examiner

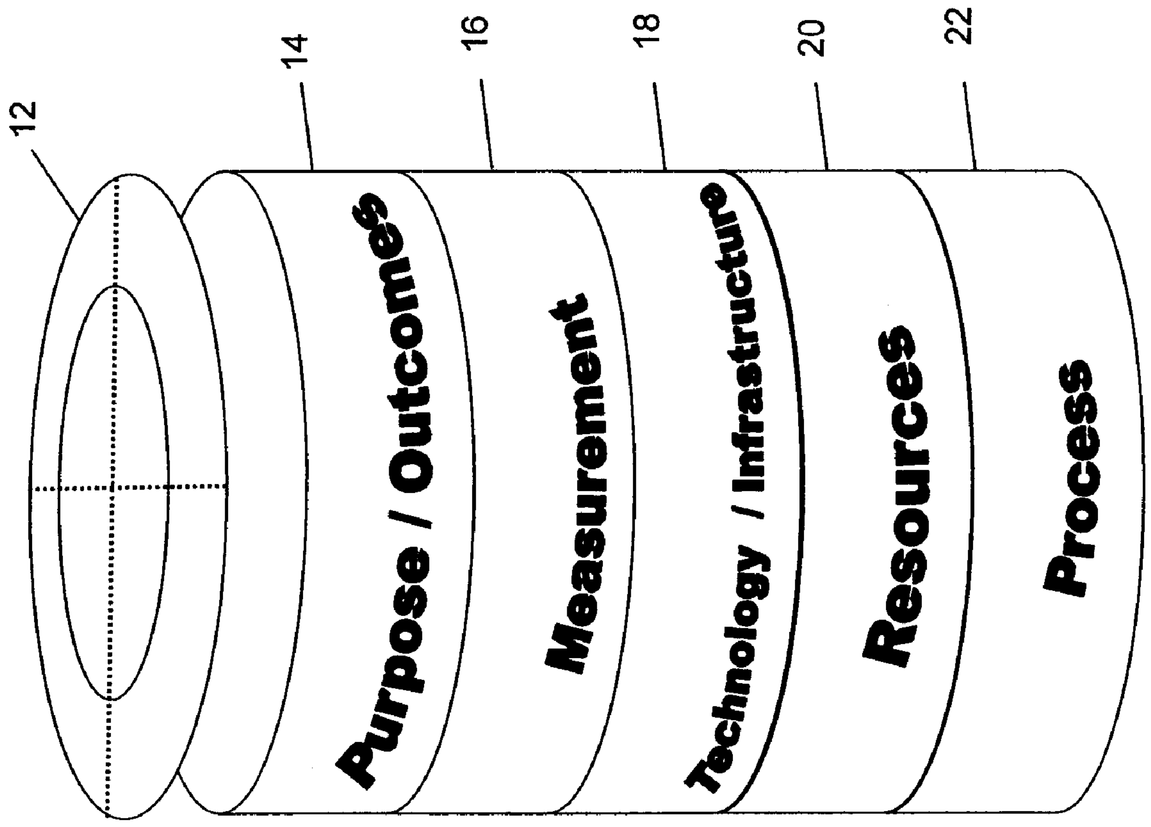
12
14
16
18
20
22
Purpose / Outcomes
Measurement
Technology / Infrastructure
Resources
Process

OPERATIONALIZING A LEARNING SOLUTION

CROSS REFERENCE TO RELATED APPLICATIONS

This is a continuation application of U.S. patent application Ser. No. 10/729,861, filed Dec. 5, 2003.

RELATED APPLICATION

This application is related to application Ser. No. 10/729,747 Entitled "BLENDED LEARNING EXPERIENCE TOOL AND METHOD" which is co-owned by the same assignee, filed on the same date, and is incorporated herein by reference.

TECHNICAL FIELD

The invention relates generally to learning systems and particularly to methods and systems for defining a specific learning solution.

BACKGROUND OF THE INVENTION

The development and delivery of learning solutions has become an important component of the services industry. Services companies provide learning solutions to individuals as well as other companies and educational institutions. For example, a company may be required by some legislation to train its employees in some specific subject matter related to the safe operation of various manufacturing or environmental processes. Or an organization may have installed new software for some business process and needs to train employees in its use within the organization. Many other training needs develop and organizations are looking to service providers to fulfill these needs rather than use their own in-house education departments as the sole provider.

Sketch, in patent application US2002/0077884, describes providing learning solutions for eliminating functional competency gaps. An online system is used to assess the level of functional competency and identify at least one gap between the assessed level and a predefined required competency for an employment function. At least one learning solution is identified that is in accordance with a preferred method of learning.

Harkey, in patent application US2002/0087346, describes forming a learning network that includes competencies as well as learning objects and knowledge objects. The nodes forming the network are linked in a particular pattern for each user accessing the network to provide improved response. Data retrieval utilities access external information sources to continuously create new nodes. A query agent accesses a competency node and associated linked knowledge and learning nodes in response to a user query. Each time a user submits a new query a relational table forming the dynamic interconnection of nodes is updated.

Haruhiko et al. in Japanese patent JP2003084653A describe in their abstract a system for supporting cooperative learning. When the system receives a request from a learner client, it specifies the present level of learning and the role of the learner.

In spite of the aforementioned developments there remains a great complexity in the development of learning solutions. In particular, the introduction of newly developed technologies for various new modes of learning has broadened the choices available. Any systematic method of dealing with this great complexity of learning solutions, it is felt, would constitute a significant advancement in the art.

OBJECTS AND SUMMARY OF THE INVENTION

It is therefore a principal object of the present invention to enhance the learning solution art by providing a process for defining a learning solution with enhanced capabilities.

It is another object to provide a system for defining a learning solution wherein enhanced operational capabilities are possible.

It is a further object to provide a computer program product with enhanced capability for defining a learning solution.

It is yet another object to provide an enhanced method to operationalize a learning solution across the complexity of solution elements available.

These and other objects are attained in accordance with one embodiment of the invention wherein there is provided a process for defining a learning solution, comprising the steps of providing a learning solution context, and aligning a plurality of solution components to the solution context.

In accordance with another embodiment of the invention there is provided a system for defining a learning solution, comprising a computer processor, program means on the processor for providing a learning solution context, and program means on the processor for aligning a plurality of solution components to the solution context.

In accordance with yet another embodiment of the invention there is provided a computer program product for instructing a processor to define a learning solution, the computer program product comprising a computer readable medium, first program instruction means for providing a learning solution context, and second program instruction means for aligning a plurality of solution components to the solution context, and wherein both the program instruction means are recorded on the medium.

BRIEF DESCRIPTION OF THE DRAWING

The FIGURE depicts aligning supporting elements to a learning solution context in accordance with the present invention.

BEST MODE FOR CARRYING OUT THE INVENTION

For a better understanding of the present invention together with other and further objects, advantages, and capabilities thereof, reference is made to the following disclosure and the appended claims in connection with the above-described drawings.

In the figure there is shown learning solution context 12. The context is provided as a circular diagram defined in related application "BLENDED LEARNING EXPERIENCE TOOL AND METHOD." As shown in the figure the circular diagram appears as a disc tipped backward in a three dimensional diagram. A learning solution context for a specific client has specific radial width for zones and inner and outer circular areas representing the relative amount of formal and informal learning respectively or vice versa in each of the zones. Reference is made to FIG. 1 of the related application.

Solution components 14-22 are shown as stacked cylinders positioned below learning solution context 12. Solution components 14-22 are generally the methods, technologies, and processes which will be used to operationalize or deliver on that learning solution depicted in a specific context 12. That is the solution components enable the solution context to be realized. However, the content of each component must be defined to align with context 12, as will be explained later.

Purpose/Outcomes solution component 14 includes defining a business or organizational purpose and desired outcome of the specific learning solution. For example, the business or organizational purpose may include increasing sales, decreasing errors, quality improvement, implementing a new business or manufacturing process or new business tools, increasing scores on standardized tests, or increasing GED graduates among some identified group, e.g. incarcerated individuals. Desired outcomes may include employee compliance with regulations, certification in a profession, ability to perform new procedures, or completing course requirements for a degree program, e.g. Bachelor of Science.

Measurements solution component 16 includes methodologies for measuring learning effectiveness. Return on investment calculations for learner performance may be specified. Other business measurements such as break even point calculations may also be selected. Other measurements may be used including an assessment of learner attitude toward a learning experience, learner acquisition of requisite knowledge and skills as defined by learning objectives, or application of acquired knowledge and skills in job performance of targeted tasks.

Technology infrastructure component 18 may involve use of new or updated technology modes involving online and internet based learning techniques and modes. Use of networks, hardware, and software to provide access and delivery of learning experiences may be specified.

Resources solution component 20 are required to support the learning solution and may include identifying, selecting, or adapting source material from content and curriculum publishers. Resources may also include scheduling space and equipment, assigning trainers, locating mentors, or obtaining licenses to use software.

Process solution component 22 may include defining and implementing processes supporting formal and informal learning such as new governance committees and procedures, incentives to encourage new behaviors, or responsibilities for updates.

Each of the solution components 14-22 is configured to align that component with specific learning solution context 12. By way of example, if a zone of context 12 has a high informal learning content, then a business measurement of measurement component 16 developed in the past for formal learning may have to be removed, de-emphasized, or modified. A new measurement geared to informal learning may have to be selected or developed in measurement component 16.

Similar specifications or selections are made in each component to create a relationship within the component corresponding to the relationships within context 12. In some cases an inverse relationship is appropriate such as a decrease in a resource highly linked to formal learning if a respective zone of context 12 shows a high informal content.

Following through on the above process for each component creates an alignment of all of the components to the specific context 12 creating an optimal learning solution.

It may also be pointed out that in a reverse manner the availability of particular elements within a component may also be used in developing specific learning solution context 12.

While there have been shown and described what are at present considered the preferred embodiments of the invention, it will be obvious to those skilled in the art that various changes and modification may be made therein without departing from the scope of the invention as defined by the appended claims.

What is claimed is:

1. A system for defining a learning solution, comprising:

a computer processor;

program means on said processor for providing a learning solution context as a circular diagram having specific radial width for zones and an inner circular wedge area defining a ratio of formal to informal learning for each of said zones; and program means on said processor for defining the content of each of a plurality of solution components to align with said zones and said circular wedge area for each of said zones of said solution context.

2. The system of claim 1, wherein said zones represent types of interaction.

3. The system of claim 1, wherein said solution components comprise purpose/outcomes, measurement, technology/infrastructure, resources, and process.

4. A computer program product for instructing a processor to define a learning solution, said computer program product comprising:

a computer readable medium;

first program instruction means for providing a learning solution context as a circular diagram having specific radial width for zones and an inner circular wedge area defining a ratio of formal to informal learning for each of said zones; and second program instruction means for defining the content of each of a plurality of solution components to align with said zones and said circular wedge area for each of said zones of said solution context; and wherein both said program instruction means are recorded on said medium.

5. The computer program product of claim 4, wherein said zones represent types of interaction.

6. The computer program product of claim 4, wherein said solution components comprise purpose/outcomes, measurements, technology/infrastructure, resources, and process.

* * * * *